(12) United States Patent
Gosalbez

(10) Patent No.: US 11,160,422 B2
(45) Date of Patent: Nov. 2, 2021

(54) SHOWER TRAY

(71) Applicant: NIETOS DE MIGUEL MARTINEZ RAMIREZ, S.L., Alicante (ES)

(72) Inventor: Miguel Martinez Gosalbez, Alicante (ES)

(73) Assignee: NIETOS DE MIGUEL MARTINEZ RAMIREZ, S.L., Alicante (ES)

( * ) Notice: Subject to any disclaimer, the term of this patent is extended or adjusted under 35 U.S.C. 154(b) by 0 days.

(21) Appl. No.: 16/633,270

(22) PCT Filed: Aug. 3, 2017

(86) PCT No.: PCT/ES2017/070567
§ 371 (c)(1),
(2) Date: Jan. 23, 2020

(87) PCT Pub. No.: WO2019/025644
PCT Pub. Date: Feb. 7, 2019

(65) Prior Publication Data
US 2021/0127907 A1    May 6, 2021

(51) Int. Cl.
*A47K 3/40* (2006.01)
*A47K 3/28* (2006.01)
*E03C 1/29* (2006.01)

(52) U.S. Cl.
CPC .............. *A47K 3/405* (2013.01); *A47K 3/281* (2013.01); *E03C 1/29* (2013.01)

(58) Field of Classification Search
CPC ....................................................... A47K 3/405

USPC ...................................................... 4/613–614
See application file for complete search history.

(56) References Cited

U.S. PATENT DOCUMENTS 6,003,169 A    12/1999 Davis, Jr.
6,102,073 A     8/2000 Williams

FOREIGN PATENT DOCUMENTS

EP    1064875 A2    1/2001
ES    2585849 A2   10/2016

OTHER PUBLICATIONS

Jan. 23, 2018—(WO) International Search Report—International App PCT/ES2017/070567.

*Primary Examiner* — Lori L Baker
(74) *Attorney, Agent, or Firm* — Banner & Witcoff, Ltd.

(57) ABSTRACT

The disclosure relates to a shower tray comprising a base element provided with a peripheral edge from where an inclined surface projects towards a drainage opening, and a surface for supporting the user formed by floor tiles, and strips which protrude from the inclined surface, wherein the upper faces of the strips form a horizontal base surface for the floor tiles, a groove is formed at least between two floor tiles for the evacuation of the water towards the inclined surface. The first ends of the floor tiles are secured on at least one transverse band or strip, and one swivelling end of the transverse band or strip includes a corner with a right-angled profile and adapted to slide on the longitudinal recess, when the floor tiles are withdrawn from their horizontal base surface.

14 Claims, 5 Drawing Sheets

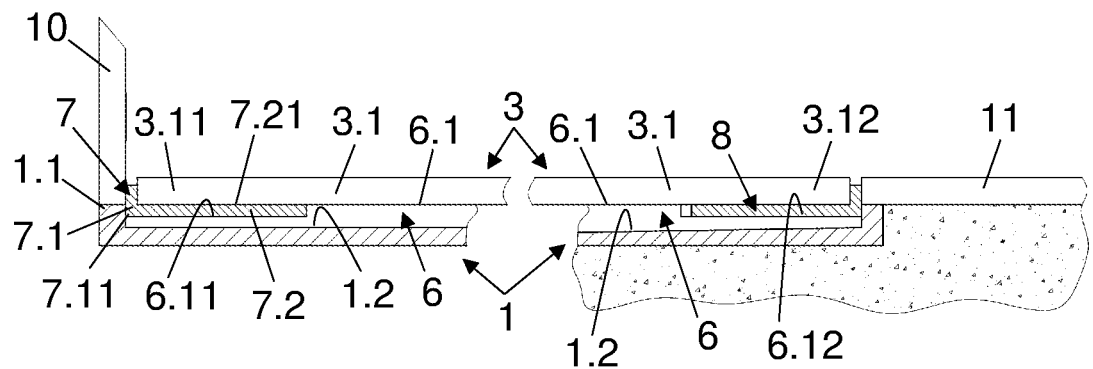
Fig. 3
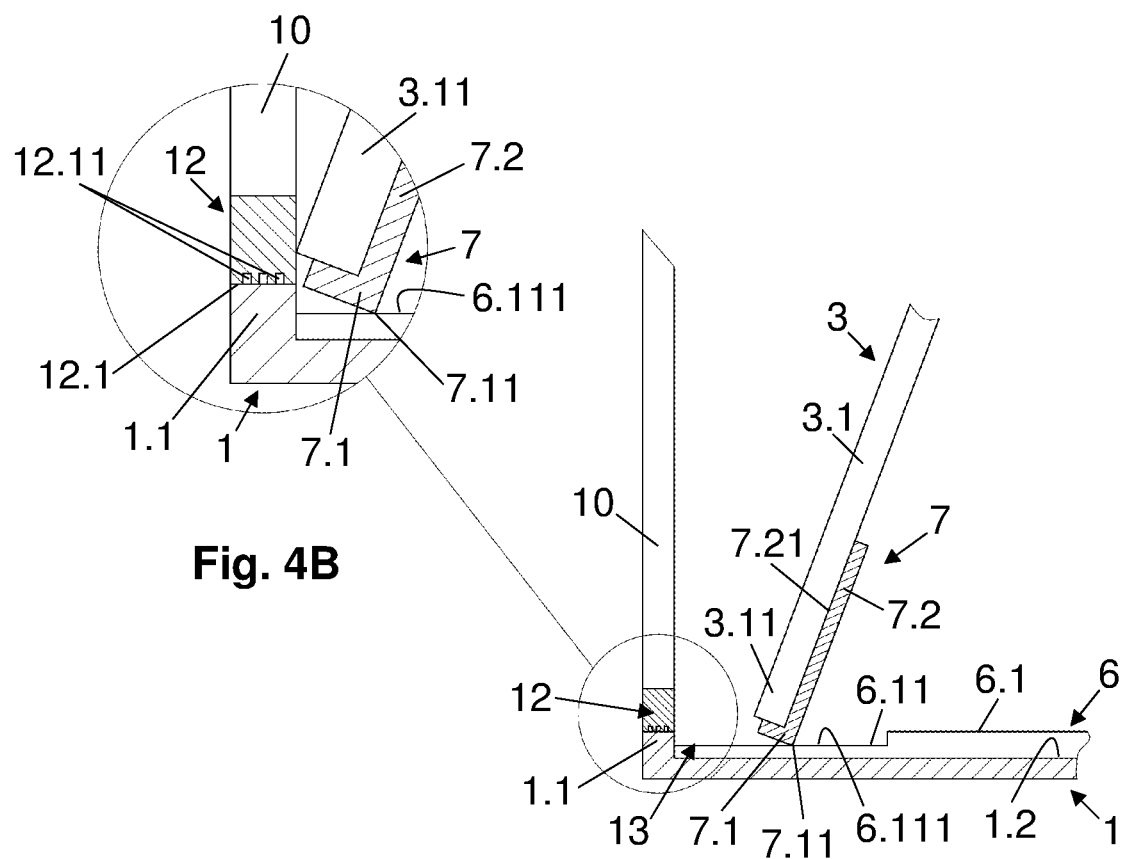
Fig. 4B
Fig. 4A

SHOWER TRAY

The present application is a U.S. National Phase Application under 35 U.S.C. § 371 of PCT/ES2017/070567 filed Aug. 3, 2017, the contents therein of the applications is incorporated by reference herein in its entirety.

OBJECT OF THE INVENTION

The present invention relates to a shower tray, in which the user support surface conceals the inclined surface and the drainage opening of its base element.

BACKGROUND OF THE INVENTION

Various shower tray designs are known, consisting of a base element with a perimeter edge from which an inclined surface projects towards a drainage hole. These shower trays are generally square, rectangular, or quarter-round shaped, according to the desired configuration inside the bathroom.

It is common that in these known shower trays, both the inclined surface and the drainage opening or hole are visible, which, negatively impacts on the visual appearance of the shower tray according to the most demanding users, who seek to follow certain aesthetic patterns of general finishes, where, the shower tray is made of the same material as the rest of the bathroom. Especially when high quality materials are used, for example, marble, in the cladding of bathroom walls and vanity tops.

Thus, shower trays are increasingly made as built-in elements, where, the floor tiles employed to form the user support surface are the same as those of the rest of the bathroom, i.e., those that cover its walls and vanity tops; such that the whole set keeps the same aesthetic pattern.

Occasionally, ceramic tiles or floor tiles are arranged on a preformed base element, made of plastic or any other type of material, where the falls are already defined and the drainage hole or opening is already set. In other cases, the base element is formed in-situ with the slopes and falls to direct the water towards the drainage opening. Setting the floor tiles on the slopes and falls causes the shower tray to spoil the aesthetics with respect to the rest of the bathroom, since the typical slopes and falls of the shower tray can be seen in the bathroom flooring assembly. On the other hand, these slopes, when stepped on by the user, can promote the occurrence of accidents due to slipping, as well as being obstacles for wheelchairs or people with reduced mobility.

For this reason, a shower tray that overcomes the aforementioned drawbacks needs to be designed in a simple and economical way.

DESCRIPTION OF THE INVENTION

The present invention is established and characterised in the independent claims, while the dependent claims describe other characteristics thereof.

The object of the invention is a shower tray. The technical problem to solve is to conceal the inclined surface and the drainage opening of the base element of the shower tray, thus contributing to the aesthetic appearance of the bathroom where it is located, as well as to the safety and accessibility of the shower tray.

In view of the foregoing, the present invention relates to a shower tray, of the type which comprise a base element, provided with a perimeter edge from which an inclined surface projects towards a drainage opening, and a user support surface, formed by a plurality of floor tiles. As mentioned, such floor tiles are usually the same as those used to cover the rest of the bathroom floor, as well as its walls and vanity tops if so desired.

The shower tray further comprises furring strips that protrude from the inclined surface, the upper faces of such furring strips forming a horizontal base surface for arranging the floor tiles thereon, where it is preferred that a groove is formed between at least two floor tiles for the evacuation of the water towards the inclined surface of the base element. Advantageously, evacuation grooves can be formed over the entire extension of the shower tray, however, these could be formed only in a certain part or parts thereof.

Additionally, first ends of the floor tiles are secured onto at least one transverse band or strip, where, the transverse band or strip comprises a swivelling end and a fastening end of the first end of the floor tile.

Likewise, a longitudinal recess is adapted to accommodate the swivelling end of the transverse band or strip, wherein said swivelling end comprises a right-angled profile corner adapted to slide on the longitudinal recess, when the floor tiles are removed from their horizontal base surface. The longitudinal recess may be formed in recesses made in the upper faces of the furring strips and/or in the perimeter edge of the base element.

Thus, the floor tiles form the user support surface in a flat manner and on the horizontal plane covering the entire shower tray, giving continuity to the rest of the bathroom floor.

As can be seen, the proposed invention manages to arrange the floor tiles of the shower tray so that the inclined surface and the drainage opening of its base element are not visible to the user, favouring the aesthetic appearance of the bathroom where it is located, as well as the safety and accessibility of the shower tray.

Likewise, the present invention facilitates the removal of the user support surface, for example, to inspect the interior of the base element of the shower tray or to carry out its cleaning.

DESCRIPTION OF THE FIGURES

This specification is supplemented with a set of drawings illustrating the preferred example and never intended to limit the invention.

FIG. 3 represents a sectional side view of the base element of the shower tray shown in FIG. 1, with the transverse band or strip in a first position for use.

FIG. 4A represents a sectional side view of the base element of the shower tray shown in FIG. 1, with the transverse band or strip in a second position for cleaning.

FIG. 4B represents an enlarged detail of FIG. 4A showing how the edges of the floor tiles are in contact with the finishing part, and not with the wall cladding, when the floor tile assembly is raised.

DETAILED DESCRIPTION OF THE INVENTION

In view of the aforementioned, the present invention relates to a shower tray.

Figure 1:
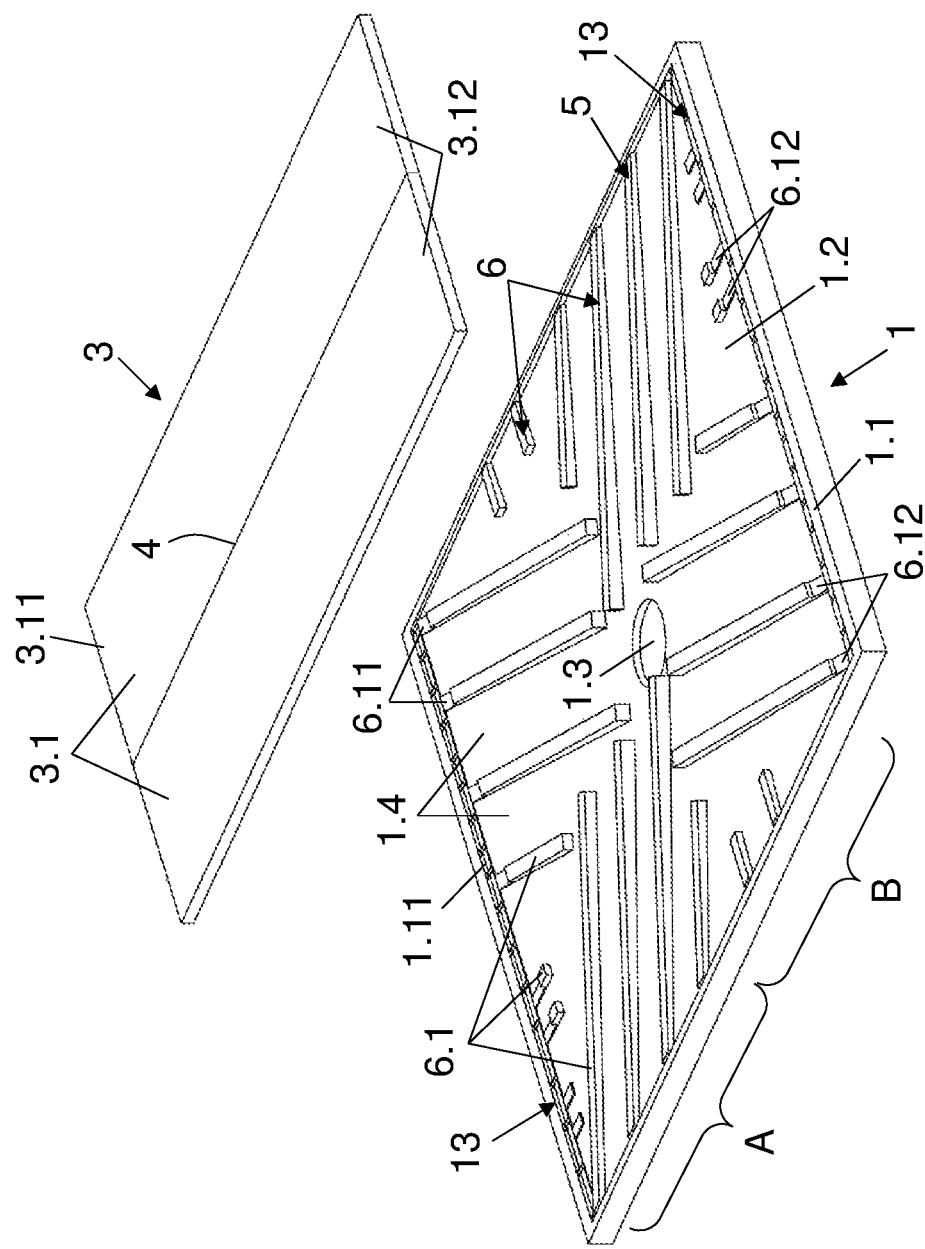
FIG. 1 represents an exploded perspective top view of the shower tray, where the interior of its base element is shown.

As shown in FIG. 1, the shower tray comprises a base element (1) provided with a perimeter edge (1.1) from which an inclined surface (1.2) projects towards a drainage opening (1.3). In the embodiment shown in the figure, the inclined surface (1.2) comprises four falls, however, it could comprise a single fall, two, three, or any number of falls, as may be required to direct the collected water towards the drainage opening (1.3).

The shower tray comprises a user support surface (3) formed by a plurality of floor tiles (3.1). These floor tiles (3.1) are arranged, side by side, coplanarly with each other, covering a horizontal base surface (5), i.e., a flat surface that is parallel to a floor cladding (11) of the bathroom where the shower tray is located.

Likewise, it is preferred that a groove (4) is formed between at least two floor tiles (3.1) for the evacuation of the water towards the inclined surface (1.2), which is arranged below the base surface (5) which supports the floor tiles (3.1). In a preferred embodiment, grooves (4) are formed on the entire user support surface (3), i.e., over the entire extension of the shower tray, however, they could be formed in only a part or parts thereof.

In any case, it is preferred that the floor tiles (3.1) be separated from each other, for example, between 1 and 3 mm. Thus, as desired, the grooves (4) will be formed in the floor tiles (3.1) between which no joints are applied (not shown in the figures), allowing the passage of water between them towards the inclined surface (1.2).

Likewise, in another possible embodiment, the evacuation of the water towards the inclined surface (1.2) could be carried out through holes or channels (not shown in the figures) that cross the floor tiles (3.1) transversely, so it is not necessary to leave grooves (4) between said floor tiles (3.1).

On the other hand, the shower tray comprises furring strips (6), which protrude from the inclined surface (1.2) with heights that vary due to the slopes and falls present on the inclined surface (1.2). The furring strips (6) and the base element (1) can form a single piece.

In a preferred embodiment, shown in FIG. 1, at least a first group (A) of furring strips (6), arranged parallel to each other and inclined with respect to the perimeter edge (1.1), extend from the latter in the direction of the drainage opening (1.3); and at least a second group (B) of furring strips (6), arranged parallel to each other and perpendicular with respect to the perimeter edge (1.1), also extend from the latter in the direction of the first group (A) of inclined furring strips (6), forming some longitudinal channels (1.4) that can lead to others to channel the water towards the drainage opening (1.3).

The amount of first (A) and second (B) groups of furring strips (6) to be employed will depend on the dimensions and geometry of the base element (1). For example, in the embodiment shown in FIG. 1, the base element (1) comprises four first groups (A) of inclined furring strips (6), arranged between a first vertex and the centre of each of its sides, and four second groups (B) of perpendicular furring strips (6), each arranged between two first groups (A), i.e., between the centre and the other vertex of each side of the base element (1). Thus, forming the base surface (5) with the upper faces (6.1) of the furring strips (6) is guaranteed, while between said furring strips (6) longitudinal channels (1.4) are formed which can lead to others to channel the water towards the drainage opening (1.3).

As mentioned, FIG. 1 shows a preferred embodiment of how to arrange the furring strips (6) on the inclined surface (1.2), however, other possible configurations could be designed from what was previously disclosed and be covered by the present invention.

In any case, it is sought to form the said base surface (5) of the floor tiles (3.1) with the upper faces (6.1) of the furring strips (6). Thus, a horizontal and extended flat user support surface (3) is formed above the entire base element (1), i.e., covering both the inclined surface (1.2) and the perimeter edge (1.1), without any obstacles for the user trying to access or exit the shower tray.

Figure 2:
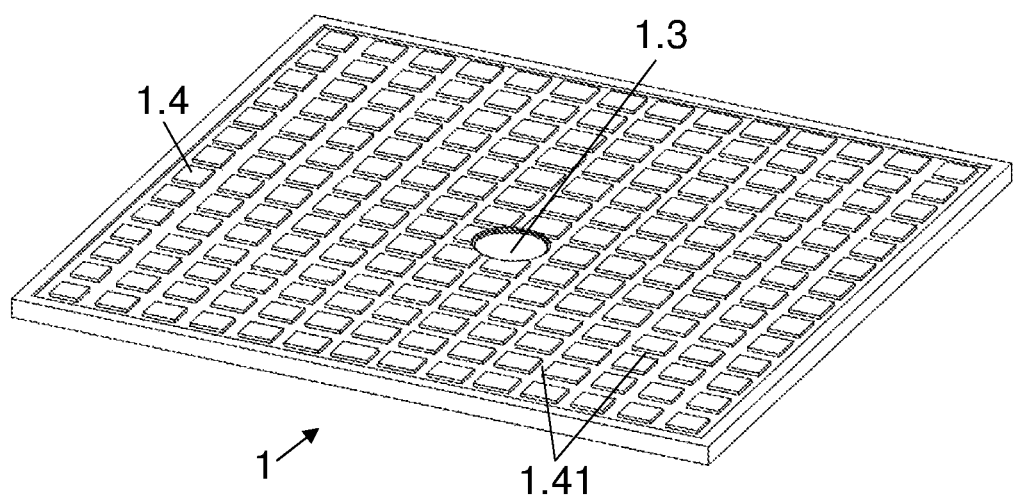
FIG. 2 represents a bottom view of the shower tray shown in FIG. 1.

Likewise, as best seen in FIG. 2, it is preferred that a lower face (1.4) of the base element (1) comprises a plurality of grooves (1.41) in a "dovetail" shape. Preferably, extended from side to side of the base element (1), intersected with each other, forming a lattice across the bottom face (1.4) of the base element (1). This favours the grip of the shower tray to the mortar (not shown in the figures) used to secure it to the floor.

On the other hand, for securing the floor tiles (3.1) to the base surface (5) it is preferred to use removable fastening means (not shown in the figure). In this way, the floor tiles (3.1) can be momentarily removed from the base surface (5), for example, to inspect the interior of the base element (1) or carry out its cleaning.

For example, the removable fastening means could be a layer of a gripping substance applied to the upper face (6.1) of the furring strips (6). This substance makes it possible to maintain a firm hold of the floor tiles (3.1) on the furring strips (6), without requiring any additional fastening means to maintain the stability of the user support surface (3) formed with said floor tiles (3.1).

Likewise, also to secure the floor tiles (3.1) to the base element (1) and to be able to remove said floor tiles (3.1) as an assembly, and not, one by one, as well as, to avoid displacements between them, as shown in FIGS. 3 to 6, the respective first two ends (3.11) of a plurality of floor tiles (3.1) are secured, for example, by a modified silane-based adhesive, on a transverse band or strip (7). Thus, it can be designed that all the floor tiles (3.1) are secured to a single transverse band or strip (7), or the shower tray has more than one transverse band or strip (7) to which a plurality of floor tiles (3.1) are secured, covering the whole base surface (5).

Figure 5:
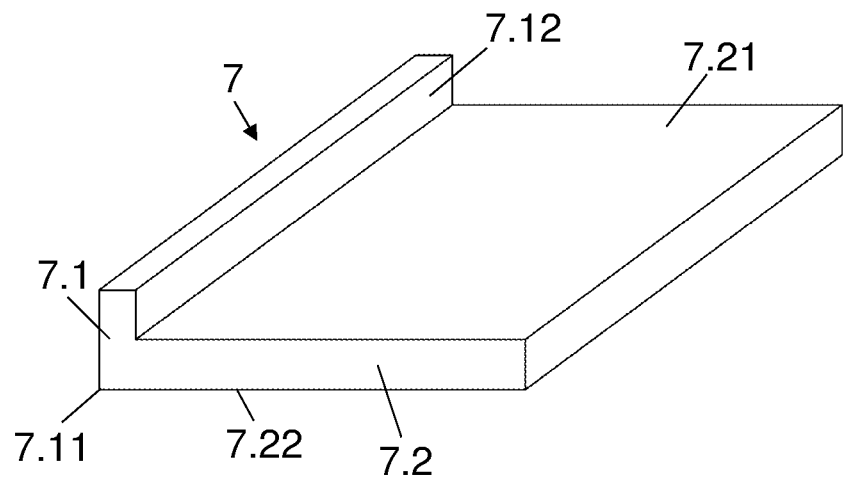
FIG. 5 represents a perspective view of a first embodiment of the transverse band or strip shown in FIGS. 3 and 4.
Figure 6:
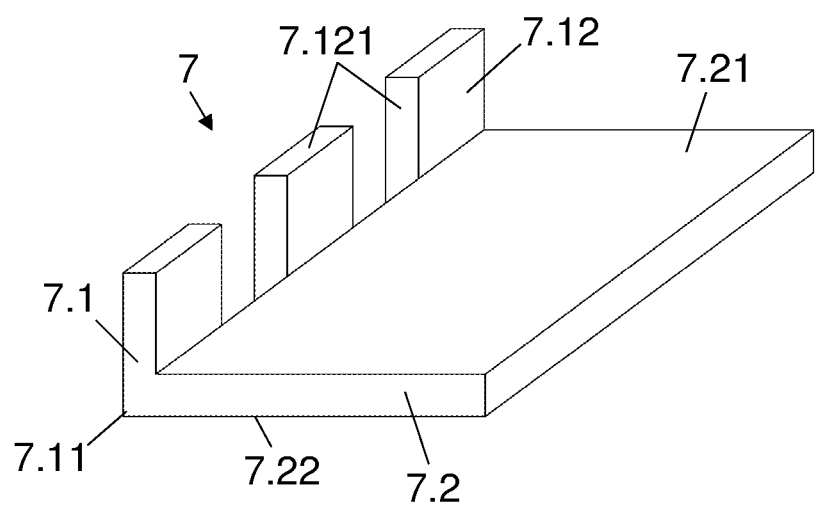
FIG. 6 represents a perspective view of a second embodiment of the transverse band or strip shown in FIGS. 3 and 4.

For its part, as shown in FIGS. 5 and 6, the transverse band or strip (7) comprises a swivelling end (7.1) with a right-angled profile corner (7.11) (formed by two planes that intersect perpendicularly), and a fastening end (7.2), preferably, with an upper step (7.21), adapted to secure the first end (3.11) of the floor tiles (3.1). The lower face (7.22) of the fastening end (7.2) also extends from the lower end of the corner (7.11) of the swivelling end (7.1).

Likewise, it is preferred that the upper step (7.21) be formed by a side wall (7.12) formed at the top at the swivelling end (7.1), which could be a continuous wall, as shown in the embodiment of FIG. 5, or it could be a discontinuous wall, see the embodiment of FIG. 6, formed by projections (7,121) spaced equidistant from each other, similar to a "comb" structure.

On the other hand, the upper faces (6.1) of the furring strips (6) can comprise respective recesses (6.11) that accommodate the transverse band or strip (7), when the floor tiles (3.1) are arranged on the base surface (5). In this case, in order that the transverse band or strip (7) is not an impediment for the floor tiles (3.1) to be properly attached to the furring strips (6), the recesses (6.11) must comprise inner dimensions that correspond with at least the outer dimensions of the transverse band or strip (7).

Likewise, the shower tray has a longitudinal recess (13) that is adapted to accommodate the swivelling end (7.1) of the transverse band or strip (7).

For its part, the right-angled profile corner (7.11) of the swivelling end (7.1) is adapted to slide transversely over the longitudinal recess (13), when it is desired to remove the floor tiles (3.1) from their horizontal base surface (5), and thus, move from the first position of use of the shower tray to the second position for its cleaning.

In a preferred embodiment, shown in FIGS. 3 and 4A, the longitudinal recess (13) is formed in the recesses (6.11) of the furring strips (6). In this case, the swivelling end (7.1) slides longitudinally on flat bottoms (6.111) of the recesses (6.11) formed on the upper faces (6.1) of the furring strips (6).

However, in another possible embodiment, shown in FIG. 1, the longitudinal recess (13) is formed on the perimeter edge (1.1) of the base element (1). In this case, for example, the swivelling end (7.1) of the transverse band or strip (7) could slide longitudinally on a flat surface (1.11) formed on the perimeter edge (1.1). Or, in another possible embodiment, the sliding of the swivelling end (7.1) could extend over the perimeter edge (1.1) and the recesses (6.11), thanks to a surface continuity existing between the flat surface (1.11) and the corresponding flat bottoms (6.111).

Preferably, the shower tray is configured with respective longitudinal recesses (13) on each of its sides, so that the sliding of the right-angled profile corner (7.11) of the swivelling end (7.1) can be carried out on any of said sides as appropriate.

On the other hand, in the embodiment wherein the longitudinal recess (13) is not formed on the perimeter edge (1.1) of the base element (1), as shown in FIG. 3, a wall cladding (10) or a floor cladding (11), or a shower screen (not shown in the figures) could be secured, for example, by a modified silane-based adhesive, on the corresponding perimeter edge portion (1.1).

Thus, as shown in FIG. 4A, once the floor tile assembly (3.1) has been lifted, for example, with the help of a tool (not shown in the figures) that is inserted through one of the slots (4) formed between said floor tiles (3.1), the swivelling end (7.1) of the transverse band or strip (7) that joins them slides along the flat bottoms (6.111) of the recesses (6.11) formed in the upper faces (6.1) of the furring strips (6), for example, to the ends of said recesses (6.11) further away from the corresponding portion of perimeter edge (1.1), to then support the upper end of the assembly against the wall cladding (10). Thus, maintaining the vertical position of the floor tile assembly (3.1) is guaranteed, for example, at an angle of approximately 92° with respect to the shower tray, for example, with a view to performing cleaning tasks thereof.

Additionally, as shown in FIG. 4B, between the wall cladding (10) and the corresponding portion of the perimeter edge (1.1) of the base element (1), an finishing part (12) could be included, which prevents the edges of the floor tiles (3.1) from coming into contact and causing damage to the wall cladding (10) when the floor tile assembly (3.1) is raised. The finishing part (12) is arranged longitudinally on the extension of the corresponding portion of perimeter edge (1.1) on which the wall cladding (10) is arranged, including at least on its lower face (12.1) a plurality of grooves (12.11) in a "dovetail" shape that guarantee a better fastening of the adhesive, for example, modified silane-based, employed for gluing the base element (1) of the shower tray.

On the other hand, it is preferred that second ends (3.12) of the floor tiles (3.1) be secured on a second transverse band or strip (8), for example, by a modified silane-based adhesive. Obviously, in case the shower tray comprises more than one transverse band or strip (8), in the same way, it will comprise the same amount of second transverse bands (8).

It is preferred that the second transverse band or strip (8) is the same as the transverse band or strip (7) to which the first ends (3.11) of the floor tiles (3.1) are secured, as shown in FIG. 3. However, said second transverse band or strip (8) could simply be a flat plate (not shown in the figures).

For their part, the upper faces (6.1) of the furring strips (6) can comprise respective second recesses (6.12) that accommodate the second transverse band or strip (8). Likewise, with the view that the second transverse band or strip (8) is not an impediment for the floor tiles (3.1) to be properly attached to the furring strips (6), the second recesses (6.12) must comprise inner dimensions that correspond with at least the outer dimensions of said second transverse band or strip (8).

Preferably, the recesses (6.11, 6.12) extend over the furring strips (6) along the entire the perimeter of the shower tray, i.e., covering all its sides, such that the placement or removal of the floor tiles (3.1) on the base element (1) can be done from either side, for example, in a rectangular tray, the floor tiles (3.1) can be placed along the length or across the width the shower tray, as appropriate.

Figure 7:
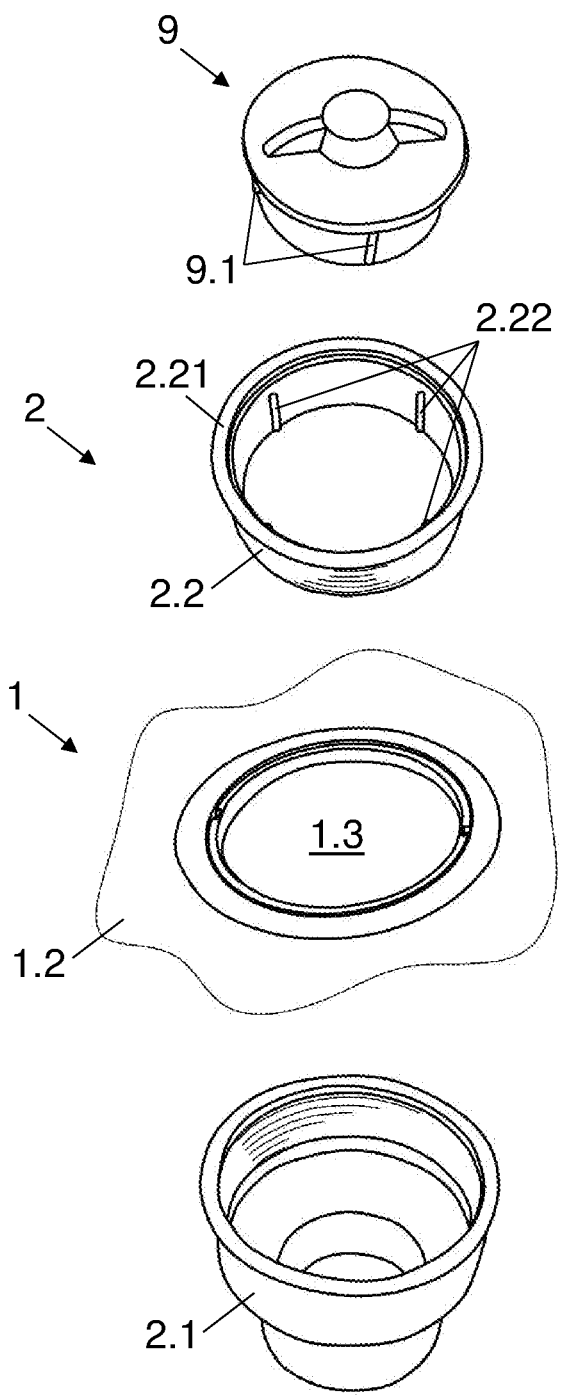
FIG. 7 represents an exploded sectional view of the coupling of the drainage means to the base element of the shower tray shown in FIG. 1.

On the other hand, drainage means (2) can be coupled to the drainage opening (1.3). As shown in FIG. 7, it is preferred that the drainage means (2) comprise a sump (2.1) and a coupling sleeve (2.2) which performs the fastening of the sump (2.1) to the drainage opening (1.3).

Thus, the coupling sleeve (2.2) is screwed into the inside of the sump (2.1), retaining the drainage opening (1.3) between said sump (2.1) and an upper rim (2.21) of the coupling sleeve (2.2).

Likewise, to carry out the screwing of the coupling sleeve (2.2) into the sump (2.1), a drive part (9) can be used, which is fitted and rotated inside the sleeve (2.2).

The drive part (9) comprises at least one outer longitudinal projection (9.1) which, when fitting and rotating the part (9) inside the coupling sleeve (2.2), pushes at least one inner longitudinal projection (2.22) of the sleeve (2.2), promoting the screwing of said sleeve (2.2) inside the sump (2.1).

The invention claimed is:

1. A Shower tray, comprising:
a base element provided with a perimeter edge from which an inclined surface projects towards a drainage opening,
furring strips protruding from the inclined surface, and
a user support surface formed by floor tiles,
wherein,
upper faces of the furring strips form a horizontal base surface of the floor tiles,
first ends of the floor tiles are secured on at least one transverse band or strip,
the transverse band or strip comprises a swivelling end and a fastening end of the first end of the floor tile, and
a longitudinal recess is adapted to accommodate the swivelling end of the transverse band or strip,
wherein the swivelling end of the transverse band or strip comprises a right-angled profile corner, said right-angled profile corner being adapted to rotate and slide along a flat surface of the longitudinal recess, when removing floor tiles from their horizontal base surface.

2. The Shower tray according to claim 1, wherein the fastening end of the transverse band or strip comprises an upper step adapted to secure the first end of the floor tile.

3. The Shower tray according to claim 2, wherein the upper step is formed by a continuous side wall formed at the top at the swivelling end.

4. The Shower tray according to claim 2, wherein the upper step is formed by a discontinuous side wall formed at the top at the swivelling end by projections spaced equidistant from each other.

5. The Shower tray according to claim 1, wherein the upper faces of the furring strips comprise respective recesses adapted to accommodate the transverse band or strip.

6. The Shower tray according to claim 5, wherein the longitudinal recess is formed in the recesses of the furring strips and/or in the perimeter edge of the base element.

7. The Shower tray according to claim 1, wherein second ends of the floor tiles are secured on a second transverse band or strip.

8. The Shower tray according to claim 7, wherein the second transverse band or strip the same as the transverse band or strip to which the first ends of the floor tiles are secured.

9. The Shower tray according to claim 7, wherein the upper faces of the furring strips comprise respective second recesses adapted to accommodate the second transverse band or strip.

10. The Shower tray according to claim 1, wherein a groove is formed at least between two floor tiles for the evacuation of the water towards the inclined surface.

11. The Shower tray according to claim 1, wherein a first group of furring strips extend parallel to each other and inclined from the perimeter edge in the direction of the drainage opening, and a second group of furring strips extend parallel to each other and perpendicular from the perimeter edge in the direction of the first group of furring strips, forming longitudinal channels that allow the passage of water to the drainage opening.

12. The Shower tray according to claim 1, wherein a lower face of the base element comprises a plurality of grooves in a "dovetail" shape.

13. The Shower tray according to claim 1, wherein a drainage [means are] is coupled to the drainage opening, where the drainage further comprises a sump and a coupling sleeve that screws into the inside of the sump, retaining the drainage opening between said sump and an upper rim of the coupling sleeve.

14. The Shower tray according to claim 13, wherein the coupling sleeve is screwed into the sump by way of a drive part that fits and rotates inside the sleeve, where, the drive part comprises at least one outer longitudinal projection which, when fitting and rotating the part inside the coupling sleeve, pushes at least one inner longitudinal projection of the sleeve, promoting the screwing of said sleeve in the sump.

* * * * *